(12) United States Patent
Nadgir et al.

(10) Patent No.: US 10,282,472 B2
(45) Date of Patent: May 7, 2019

(54) POLICY DRIVEN CONTEXTUAL SEARCH

(71) Applicant: International Business Machines Corporation, Armonk, NY (US)

(72) Inventors: Devaprasad K. Nadgir, Bangalore (IN); Ramkumar Ramalingam, Theni (IN)

(73) Assignee: International Business Machines Corporation, Armonk, NY (US)

(*) Notice: Subject to any disclaimer, the term of this patent is extended or adjusted under 35 U.S.C. 154(b) by 827 days.

(21) Appl. No.: 14/698,153

(22) Filed: Apr. 28, 2015

(65) Prior Publication Data

US 2016/0092521 A1 Mar. 31, 2016

Related U.S. Application Data

(63) Continuation of application No. 14/501,421, filed on Sep. 30, 2014, now abandoned.

(51) Int. Cl.
*G06F 17/30* (2006.01)
(52) U.S. Cl.
CPC .. *G06F 17/30864* (2013.01); *G06F 17/30082* (2013.01); *G06F 17/30424* (2013.01); *G06F 17/30528* (2013.01); *G06F 17/30646* (2013.01)
(58) Field of Classification Search
CPC ......... G06F 17/30864; G06F 17/30082; G06F 17/30424; G06F 17/30528; G06F 17/30646
USPC ....................................................... 707/722
See application file for complete search history.

(56) References Cited

U.S. PATENT DOCUMENTS

| | | | |
|---|---|---|---|
| 6,169,986 B1 | 1/2001 | Bowman |
| 7,630,980 B2 | 12/2009 | Parikh |
| 7,636,714 B1 | 12/2009 | Lamping et al. |
| 7,984,035 B2 | 7/2011 | Levin et al. |
| 8,020,110 B2 | 9/2011 | Hurst |
| 8,161,073 B2 | 4/2012 | Connor |

(Continued)

FOREIGN PATENT DOCUMENTS

CN 101320382 B 12/2011

OTHER PUBLICATIONS

Javnozon et al., "Search Refinement Using Contextual Choices", Apr. 2, 2009, IPCOM000181468D, <http://ip.com/IPCOM/000181468>.

(Continued)

*Primary Examiner* — Evan Aspinwall
(74) *Attorney, Agent, or Firm* — Christopher K. McLane; Maeve M. Carpenter

(57) ABSTRACT

In an approach to contextual search of electronic records, one or more computer processors receive a first search request from a user. The one or more computer processors send a plurality of first search results associated with the first search request to the user. The one or more computer processors receive one or more selected policies from the user, based, at least in part, on the plurality of search results. Responsive to receiving the one or more selected policies, the one or more computer processors apply the one or more selected policies to the plurality of first search results. The one or more computer processors generate a second search request based, at least in part, on the one or more applied selected policies. The one or more computer processors send a plurality of second search results associated with the second search request to the user.

17 Claims, 4 Drawing Sheets

(56) References Cited

U.S. PATENT DOCUMENTS

| | | |
|---|---|---|
| 8,229,909 B2 | 7/2012 | Wang et al. |
| 8,370,352 B2 | 2/2013 | Lita et al. |
| 8,583,675 B1 | 11/2013 | Haahr |
| 8,645,390 B1 | 2/2014 | Oztekin et al. |
| 8,655,872 B2 | 2/2014 | Kraft |
| 8,762,368 B1 | 6/2014 | Duddu et al. |
| 8,789,056 B2 | 7/2014 | Cragun et al. |
| 9,384,244 B1 | 7/2016 | Garg |
| 2001/0013036 A1 | 8/2001 | Judicibus |
| 2006/0265391 A1 | 11/2006 | Posner |
| 2009/0228439 A1* | 9/2009 | Manolescu ....... G06F 17/30864 |
| 2010/0100562 A1* | 4/2010 | Millsap ............. G06F 17/30398 707/770 |
| 2012/0265528 A1* | 10/2012 | Gruber .................. G10L 15/18 704/235 |
| 2013/0080412 A1 | 3/2013 | Kritt |
| 2013/0262449 A1 | 10/2013 | Arroyo |
| 2014/0129942 A1 | 5/2014 | Rathod |
| 2014/0236918 A1 | 8/2014 | Cohen et al. |
| 2015/0019537 A1* | 1/2015 | Neels ................ G06F 17/30551 707/722 |

OTHER PUBLICATIONS

Livne et al., "CiteSight: Supporting Contextual Citation Recommendation Using Differential Search", Jul. 6-11, 2014, SIGIR '14, <http://research.microsoft.com/en-us/um/people/teevan/publications/papers/sigir14-citesight.pdf>.

U.S. Appl. No. 14/501,421, filed Sep. 30, 2014.

List of IBM Patents or Patent Applications Treated as Related (Appendix P), Apr. 24, 2015.

* cited by examiner

US 10,282,472 B2

POLICY DRIVEN CONTEXTUAL SEARCH

BACKGROUND OF THE INVENTION

The present invention relates generally to the field of text-based searching of electronic records, and more particularly to policy driven contextual search of electronic records.

Data search provides quick access to desired data that may be buried in large data sets. As such, search features are extensively employed in data intensive processing applications. A key factor of data searches is efficiency, both time efficiency and computational efficiency.

Search systems provide search results in response to a search query from a user. The search results are often presented in a ranked list, based on the search query from the user. The ranked list of search results may be associated with a variety of different topics. The ranked list of search results may include search results associated with a topic that the user does not find useful and/or did not intend to be included within the ranked list of search results. Search systems can be enhanced by incorporating context as well as key words into a search function. By taking context into account when executing a search function, the search becomes a personalized search.

SUMMARY

Embodiments of the present invention disclose a method for contextual search of electronic records. The method for contextual search of electronic records may include one or more computer processors receiving a first search request from a user. The one or more computer processors send a plurality of first search results associated with the first search request to the user. The one or more computer processors receive one or more selected policies from the user, based, at least in part, on the plurality of search results. Responsive to receiving the one or more selected policies, the one or more computer processors apply the one or more selected policies to the plurality of first search results. The one or more computer processors generate a second search request based, at least in part, on the one or more applied selected policies. The one or more computer processors send a plurality of second search results associated with the second search request to the user.

DETAILED DESCRIPTION

A user may be searching for a problem needing a solution in a large database with several million records. Often, big data based search engines have a query approach that searches for relevant "terms" or "key words" to arrive at a data set that can help the user with the problem. While this approach works, the search can be laborious and may require the user to have specialized skills and knowledge to continue the search, via trial and error, before reaching the sought after data set.

Embodiments of the present invention recognize that efficiency may be gained by implementing a contextual search based on a pre-defined set of policies that helps users define, refine, and quickly access contextual search algorithms. Implementation of embodiments of the invention may take a variety of forms, and exemplary implementation details are discussed subsequently with reference to the Figures.

Figure 1:
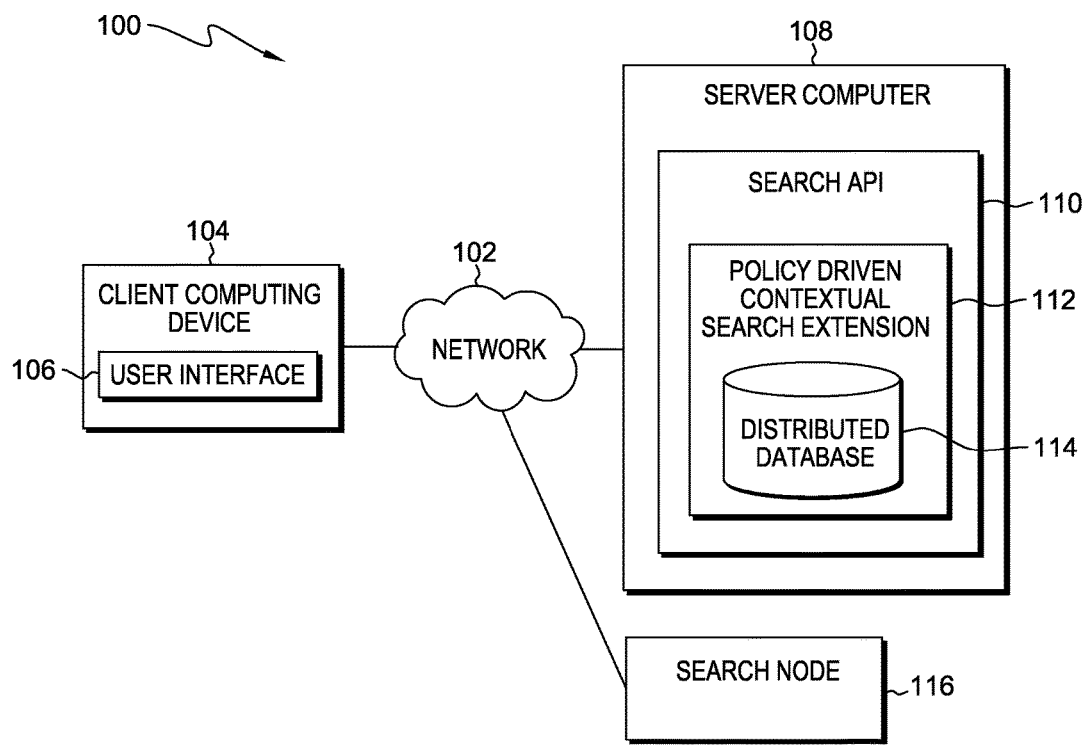
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104, server computer 108, and search node 116, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information.

Client computing device 104 can be a desktop computer, a laptop computer, a tablet computer, a specialized computer server, a smart phone, or any programmable electronic device capable of communicating with server computer 108 and search node 116 via network 102 and with various components and devices within distributed data processing environment 100. In general, client computing device 104 represents any programmable electronic device or combination of programmable electronic devices capable of executing machine readable program instructions and communicating with other computing devices via a network, such as network 102. Client computing device 104 includes user interface 106.

User interface 106 provides an interface between a user of client computing device 104 and server computer 108. User interface 106 may be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. User interface 106 may also be mobile application software that provides an interface between a user of client computing device 104 and server computer 108.

Mobile application software, or an "app", is a computer program designed to run on smart phones, tablet computers and other mobile devices. User interface 106 enables a user of client computing device 104 to perform policy driven contextual searches on server computer 108.

Server computer 108 can be a management server, a web server, or any other electronic device or computing system capable of receiving and sending data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and search node 116 via network 102. In another embodiment, server computer 108 represents a computing system utilizing clustered computers and components to act as a single pool of seamless resources. Server computer 108 includes search application programming interface 110 and policy driven contextual search extension 112.

Search application programming interface (API) 110 manages the search function by distributing a search query to participating search nodes in a distributed search cluster and returning a set of search results to user interface 106. An API is a particular set of rules and specifications that a software program can follow to access and make use of the services and resources provided by another particular software program that implements that API. An API serves as an interface between different software programs and facilitates their interaction, similar to the way a user interface facilitates interaction between humans and computers. Search API 110 is extended by using a policy driven contextual search extension component to enable contextual searches for the user. Search API 110 is depicted and described in further detail with respect to FIG. 2 and FIG. 3.

Policy driven contextual search extension (PCSE) 112 augments search API 110 to perform searches based on one or more policies chosen by the user. PCSE 112 returns search results and maintains the state of the contextual search for a recursive search with further contextual search policies applied. PCSE 112 includes distributed database 114.

Distributed database 114 resides on server computer 108. In another embodiment, distributed database 114 can reside elsewhere in the environment. A database is an organized collection of data. Distributed database 114 can be implemented with any type of storage device capable of storing data that can be accessed and utilized by server computer 108, such as a database server, a hard disk drive, or a flash memory. In other embodiments, distributed database 114 can represent multiple storage devices within server computer 108. Distributed database 114 stores data related to search queries. For example, distributed database 114 may store key words used in a query. In another example, distributed database 114 may store search handles associated with each search. A search handle is an identifier of a particular search or query. Distributed database 114 also stores contextual search policies from which a user can choose for sequential and recursive searches.

Search node 116 can be a management server, a web server, or any other electronic device or computing system capable of receiving and sending data. In other embodiments, search node 116 can represent a server computing system utilizing multiple computers as a server system, such as in a cloud computing environment. In another embodiment, search node 116 can be a laptop computer, a tablet computer, a netbook computer, a personal computer (PC), a desktop computer, a personal digital assistant (PDA), a smart phone, or any programmable electronic device capable of communicating with client computing device 104 and server computer 108 via network 102. In another embodiment, search node 116 represents a computing system utilizing clustered computers and components to act as a single pool of seamless resources. Search node 116 represents one or more physical systems that hold data in a searchable format. Search node 116 may be part of a distributed search cluster of multiple search nodes.

In an embodiment, server computer 108 may represent multiple servers, within a distributed architecture, acting as API processing nodes that may be, for example, hypertext transfer protocol (HTTP) servers. The API processing nodes each include PCSE 112 as a component. The API processing nodes receive search requests via a load balancer which manages the search load and chooses an API processing node to execute a search. The API processing nodes interact with a plurality of search nodes, arranged in a distributed search cluster, that hold data in a searchable format. Block storage is available to the search nodes to support the distributed search cluster.

Figure 2:
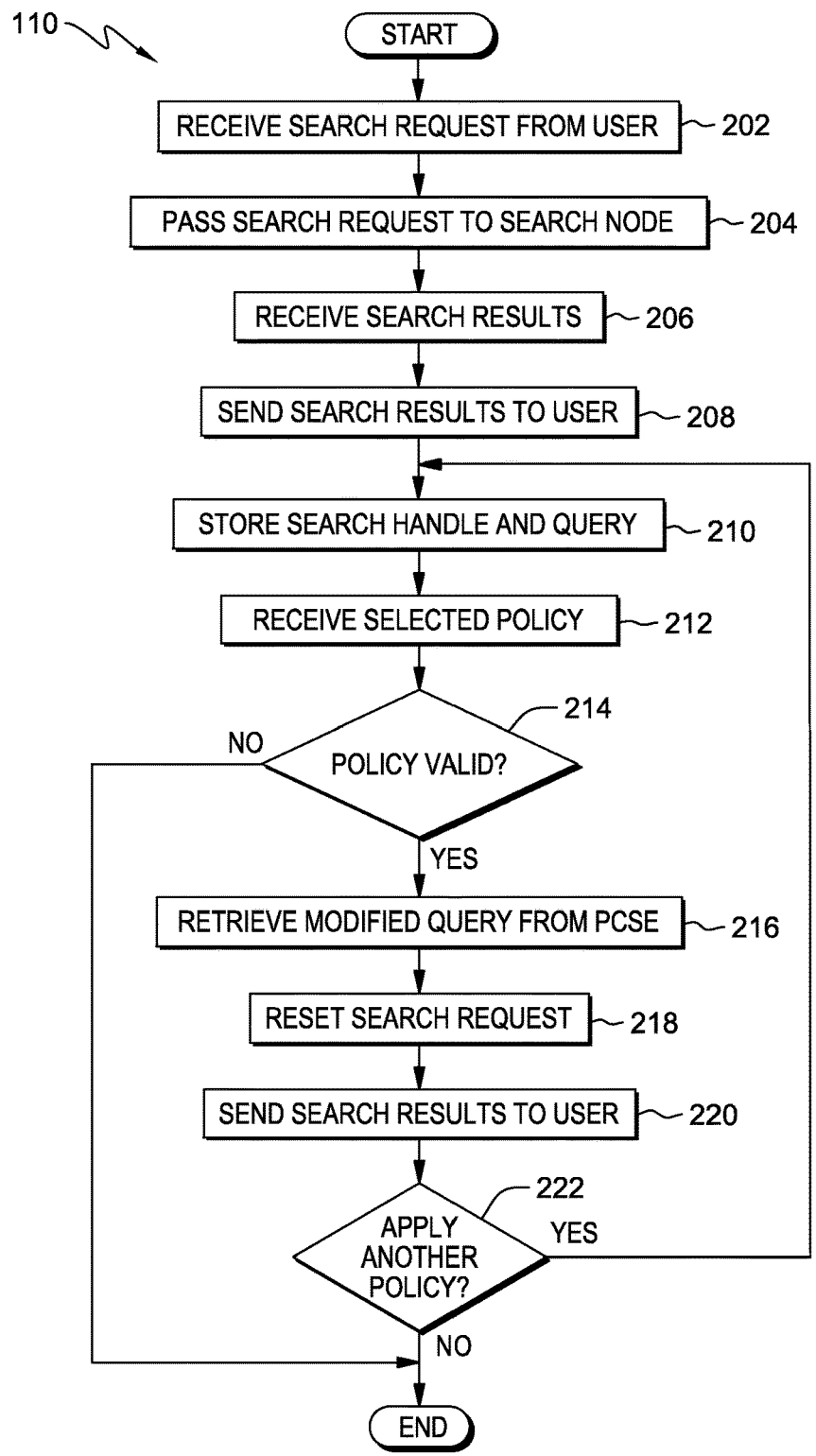
FIG. 2 is a flowchart depicting operational steps of a search application programming interface (API), on a server computer within the distributed data processing environment of FIG. 1, for applying a sequential, contextual search based on a pre-defined set of policies, in accordance with an embodiment of the present invention.

FIG. 2 is a flowchart depicting operational steps of search application programming interface (API) 110, on server computer 108 within distributed data processing environment 100 of FIG. 1, for applying a sequential, contextual search based on a pre-defined set of policies, in accordance with an embodiment of the present invention.

Search API 110 receives a search request from a user (step 202). When a user of client computing device 104 requests a global search, via user interface 106, search API 110 receives the request.

Search API 110 passes the search request to search node 116 (step 204). In an embodiment where search node 116 is one search node in a distributed search cluster, search API 110 passes the search request to the distributed search cluster for data retrieval. Responsive to passing the search request to search node 116, search API 110 receives search results from search node 116 (step 206).

Search API 110 sends search results to the user (step 208). When search API 110 receives data from search node 116, search API 110 sends the search results to the user, via user interface 106. In one embodiment, search API 110 also sends the query information along with the search results. The query information may be the specifics of how the request was passed to the search node.

Search API 110 stores the search handle and query (step 210). Search API 110 stores the state of the initial search by storing the search handle and the query information in distributed database 114. The search handle is an address that holds the search query and the user session that has returned a set of results. The search handle can be used to replicate the query and produce the same search results.

Search API 110 receives a selected policy (step 212). Based on the initial global search results, the user chooses to perform a contextual search. By invoking PCSE 112, the user can choose one or more policies with which to filter the search or search a particular aspect of the initial global search results. The user chooses a policy from the policies stored in distributed database 114. In one embodiment, search API 110 prompts the user to choose a policy by presenting an interactive list from which the user can choose. In another embodiment, search API 110 may recommend one or more particular policies to the user, based on analytics of the user's previous choices and/or results. The policies are declarative, i.e., the user can choose a preconfigured policy and edit the policy to specify the next search. A plurality of policies may exist in distributed database 114. For example, there may be a time window policy, where the user can specify the next search to look at data gathered during a specific time range. In another example, there may be a field correlation policy. A field correlation policy may filter the previous search results by looking for all data associated with a particular data field, such as an error code. In a further example, there may be a sub-search policy. A user can choose a sub-search policy to, for example, choose all errors associated with a particular server from a list of system errors. A user can choose one or more or a combination of policies with which to filter the subsequent search.

Search API 110 determines whether the received policy is valid (decision block 214). Search API 110 reviews the declarative policy received from the user, via user interface 106, and determines whether the policy has any errors or omissions, for example, with regard to field accuracy, that may make the policy invalid. In one embodiment, search API 110 determines whether the received policy is valid by comparing the policy to pre-defined constraints, and determining whether the policy complies with the pre-defined constraints. For example, if the available time range for a time window policy is between 1 and 5 minutes, and the user specifies 6 minutes, then the policy is not valid. If search API 110 determines the received policy is not valid ("no" branch, decision block 214), then search API 110 ends the search. In one embodiment, if search API 110 determines the received policy is not valid, search API 110 may send the user an error message, via user interface 106.

If search API 110 determines the received policy is valid ("yes" branch, decision block 214), then search API 110 retrieves the modified query from PCSE 112 (step 216). PCSE 112 provides the modified query for the recursive contextual search. PCSE 112 applies the received selected policies that act as context filters of the initial search results. For example, the original query is "severity:error AND source:server1", and a time window policy of "search surrounding 1 minute" is applied, then PCSE 112 modifies the query to "severity:error AND source:server1 AND datetime: [2014-09-09T13:14:145Z TO 2014-09-09T13:15:145Z]".

Search API 110 resets the search request (step 218). Search API 110 invokes a new distributed search with the modified query to reset the initial search request to a request that includes the declarative policies. Search API 110 passes the new search request to search node 116, and receives updated search results from search node 116. For example, if the initial search request is a global search on all system errors and warnings, the next search request, based on applying a time window policy, is for all errors and warnings associated with a specific server over a specified period of time.

Search API 110 sends search results to the user (step 220). As discussed above with respect to step 208, when search API 110 receives data from search node 116, search API 110 sends the search results to the user, via user interface 106.

Search API 110 determines whether the user wants to apply another policy (decision block 222). Responsive to receiving the results of the contextual search, the user may decide to further filter the search results with one or more additional policies, thus performing recursive contextual search queries. The user may recursively filter and query the data set until the user is satisfied with the result. If search API 110 determines that the user does not want to apply another policy ("no" branch, decision block 222), then search API 110 ends the search.

If search API 110 determines that the user does want to apply another policy ("yes" branch, decision block 222), then search API 110 returns to step 210 and stores the search handle and query for the previous search. The recursive search process continues until the user chooses to end the search.

Figure 3:
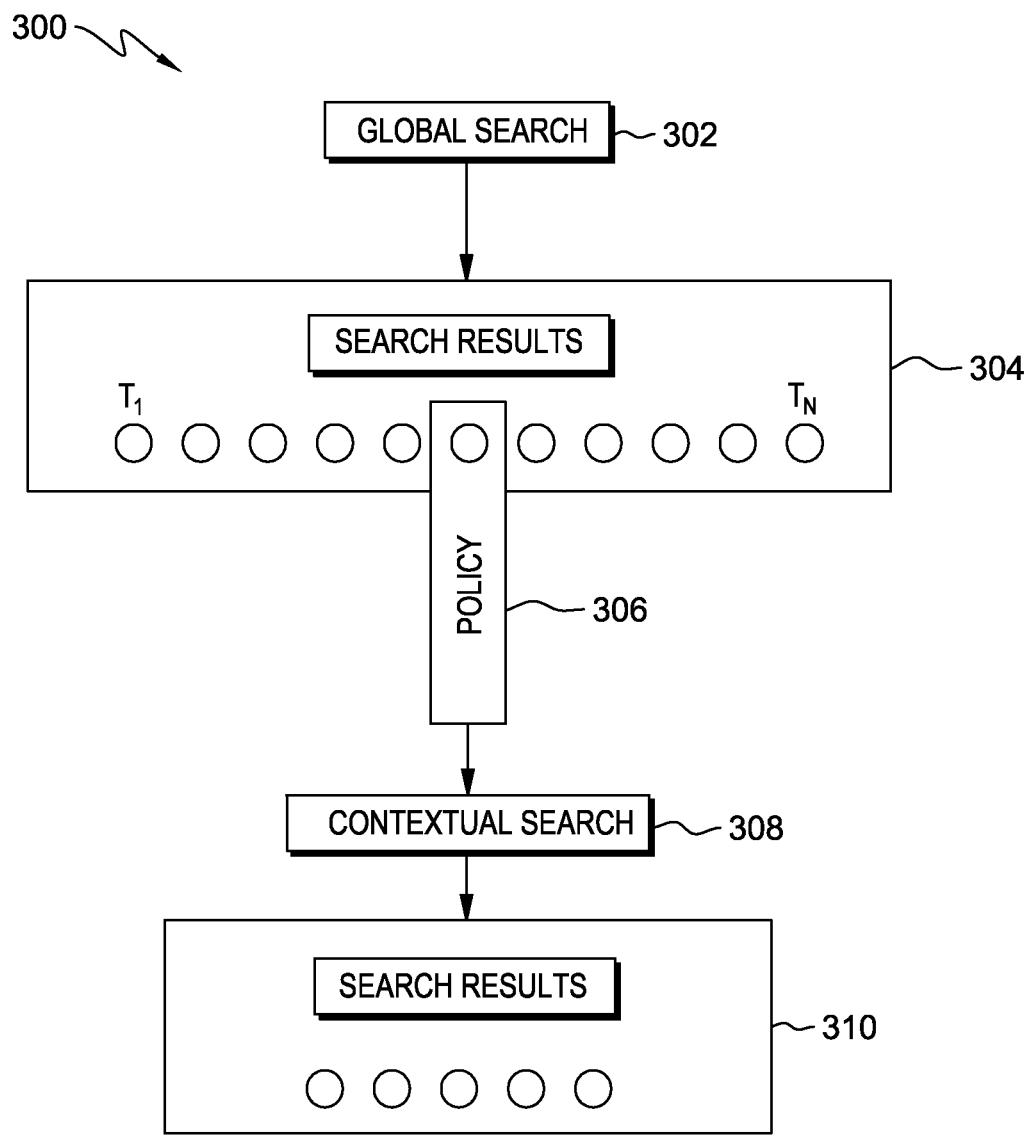
FIG. 3 is a flow diagram depicting operational steps of the search API, on a server computer within the distributed data processing environment of FIG. 1, for applying a sequential, contextual search based on a pre-defined set of policies, in accordance with an embodiment of the present invention.

FIG. 3 is a flow diagram depicting operational steps of search API 110, on server computer 108 within distributed data processing environment 100 of FIG. 1, for applying a sequential, contextual search based on a pre-defined set of policies, in accordance with an embodiment of the present invention.

Flow diagram 300 depicts an example of a search conducted with PCSE 112 within search API 110. A user requests global search 302, via user interface 106, through search API 110. For example, a user trying to diagnose a system problem may request to search for all errors and warnings. Search API 110 yields search results 304. Search results 304 include a plurality of events, represented by circles. The events may include occurrences of errors, warnings, and downtime. In the example, the plurality of events occurred between time $T_1$ and $T_N$. The user finds a particular search result of interest. For example, the user may notice that a particular search result indicates that a specific server has an error. The user chooses to apply policy 306 from PCSE 112 which is stored in distributed database 114. For example, policy 306 may be a time window policy that restricts the next search to a particular hour in time between $T_1$ and $T_N$. The policy acts as a contextual filter. Applying the contextual filter from PCSE 112, search API 110 performs contextual search 308. For example, search API 110 performs a search with the scope of the server that experienced an error and the time window policy of one hour, and lists similar errors or warnings that occurred for that server within that one hour window. Search results 310 are the results of contextual search 308. The specific result set shown in search results 310 helps the user identify specific information, for example, to address the system problem.

Figure 4:
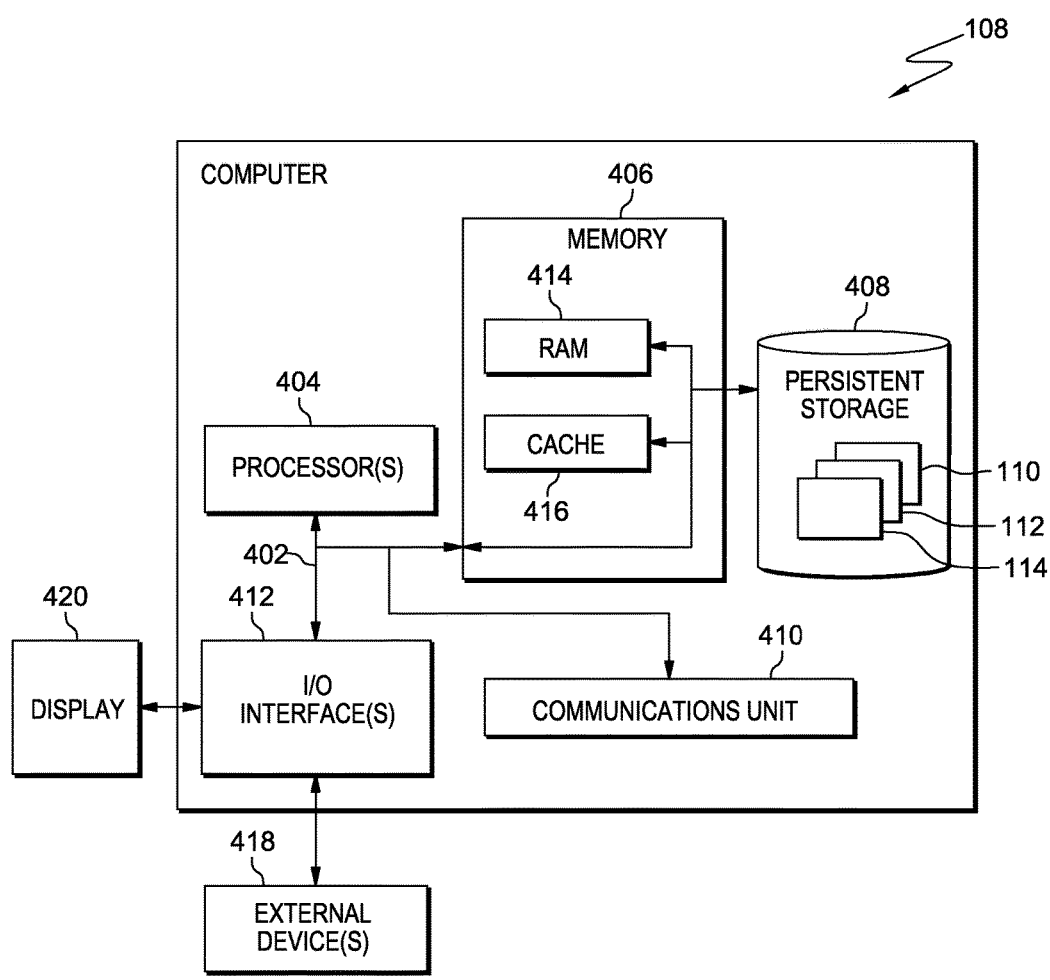
FIG. 4 depicts a block diagram of components of the server computer executing the search API within the distributed data processing environment of FIG. 1, in accordance with an embodiment of the present invention.

FIG. 4 depicts a block diagram of components of server computer 108 executing PCSE 112 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Search API 110, PCSE 112, and distributed database 114 are stored in persistent storage 408 for execution and/or access by one or more of the respective computer processor(s) 404 of server computer 108 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104 and search node 116. In these examples, communications unit 410 includes one or more network interface cards. Communications unit 410 can provide communications through the use of either or both physical and wireless communications links. Search API 110, PCSE 112, and distributed database 114 can be downloaded to persistent storage 408 of server computer 108 through communications unit 410.

I/O interface(s) 412 allows for input and output of data with other devices that can be connected to server computer 108. For example, I/O interface(s) 412 can provide a connection to external device(s) 418 such as a keyboard, a keypad, a touch screen, a microphone, and/or some other suitable input device. External device(s) 418 can also include portable computer readable storage media such as, for example, thumb drives, portable optical or magnetic disks, and memory cards. Software and data used to practice embodiments of the present invention, e.g., search API 110, PCSE 112, and distributed database 114 on server computer 108, can be stored on such portable computer readable storage media and can be loaded onto persistent storage 408 of server computer 108 via I/O interface(s) 412. I/O interface(s) 412 also connect to a display 420.

Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for contextual search of electronic records, the method comprising:
receiving, by one or more computer processors, a first search request from a user;
sending, by the one or more computer processors, first search results associated with the first search request to the user;
recommending, by the one or more computer processors, one or more search policies to the user via an interactive list, based, at least in part, on analytics of one or more previous choices of search policies by the user, wherein a search policy is used to filter a search;
receiving, by the one or more computer processors, one or more selected search policies from the user via a user interface, wherein the one or more selected search policies include at least a time window policy;
responsive to receiving the one or more selected search policies, determining, by the one or more computer processors, whether the one or more selected search policies are valid, wherein determining whether the one or more selected search policies are valid includes determining, by the one or more computer processors, field accuracy by reviewing the one or more selected search policies for one or more errors;
responsive to determining the one or more selected search policies are valid, applying, by the one or more computer processors, the one or more selected search policies to the first search results;
generating, by the one or more computer processors, a contextual search request based, at least in part, on the one or more applied selected search policies, wherein the contextual search request is an update of the first search request; and
sending, by the one or more computer processors, search results associated with the contextual search request to the user.

2. The method of claim 1, further comprising:
responsive to sending the search results associated with the contextual search request to the user, determining, by the one or more computer processors, whether one or more additional selected search policies are received from the user;
responsive to determining the one or more additional selected search policies are received from the user, applying, by the one or more computer processors, the one or more additional selected search policies to the search results associated with the contextual search request;
generating, by the one or more computer processors, a third search request based, at least in part, on the one or more additional applied selected search policies; and
sending, by the one or more computer processors, a plurality of third search results associated with the third search request to the user.

3. The method of claim 1, further comprising storing, by the one or more computer processors, a search handle and a query associated with the first search request.

4. The method of claim 1, wherein the one or more selected search policies include at least one of: a field correlation policy, and a sub-search policy.

5. The method of claim 1, wherein generating a contextual search request based, at least in part, on the one or more applied selected search policies further comprises:
retrieving, by the one or more computer processors, a modified query, wherein the modified query includes the one or more selected search policies applied to the first search results; and
invoking, by the one or more computer processors, the contextual search request, wherein the contextual search request includes the one or more selected search policies.

6. The method of claim 1, wherein determining whether the one or more selected search policies are valid further comprises:
- comparing, by the one or more computer processors, the one or more selected search policies to pre-defined constraints; and
- determining, by the one or more computer processors, whether the one or more selected search policies comply with the pre-defined constraints.

7. A computer program product for contextual search of electronic records, the computer program product comprising:
- one or more computer readable storage devices and program instructions stored on the one or more computer readable storage devices, wherein the one or more computer readable storage devices are hardware, the program instructions comprising:
- program instructions to receive a first search request from a user;
- program instructions to send first search results associated with the first search request to the user;
- program instructions to recommend one or more search policies to the user via an interactive list, based, at least in part, on analytics of one or more previous choices of search policies by the user, wherein a search policy is used to filter a search;
- program instructions to receive one or more selected search policies from the user via a user interface, wherein the one or more selected search policies include at least a time window policy;
- responsive to receiving the one or more selected search policies, program instructions to determine whether the one or more selected search policies are valid, wherein program instructions to determine whether the one or more selected search policies are valid includes program instructions to determine field accuracy by reviewing the one or more selected search policies for one or more errors;
- responsive to determining the one or more selected search policies are valid, program instructions to apply the one or more selected search policies to the first search results;
- program instructions to generate a contextual search request based, at least in part, on the one or more applied selected search policies, wherein the contextual search request is an update of the first search request; and
- program instructions to send search results associated with the contextual search request to the user.

8. The computer program product of claim 7, further comprising:
- responsive to sending the search results associated with the contextual search request to the user, program instructions to determine whether one or more additional selected search policies are received from the user;
- responsive to determining the one or more additional selected search policies are received from the user, program instructions to apply the one or more additional selected search policies to the search results associated with the contextual search request;
- program instructions to generate a third search request based, at least in part, on the one or more additional applied selected search policies; and
- program instructions to send a plurality of third search results associated with the third search request to the user.

9. The computer program product of claim 7, further comprising program instructions to store a search handle and a query associated with the first search request.

10. The computer program product of claim 7, wherein the one or more selected search policies include at least one of: a field correlation policy and a sub-search policy.

11. The computer program product of claim 7, wherein program instructions to generate a contextual search request based, at least in part, on the one or more applied selected search policies further comprises:
- program instructions to retrieve a modified query, wherein the modified query includes the one or more selected search policies applied to the first search results; and
- program instructions to invoke the contextual search request, wherein the contextual search request includes the one or more selected search policies.

12. The computer program product of claim 7, wherein determining whether the one or more selected search policies are valid further comprises:
- comparing, by the one or more computer processors, the one or more selected search policies to pre-defined constraints; and
- determining, by the one or more computer processors, whether the one or more selected search policies comply with the pre-defined constraints.

13. A computer system for contextual search of electronic records, the computer system comprising:
- one or more computer processors;
- one or more computer readable storage media;
- program instructions stored on the one or more computer readable storage media for execution by at least one of the one or more computer processors, the program instructions comprising:
- program instructions to receive a first search request from a user;
- program instructions to send first search results associated with the first search request to the user;
- program instructions to recommend one or more search policies to the user via an interactive list, based, at least in part, on analytics of one or more previous choices of search policies by the user, wherein a search policy is used to filter a search;
- program instructions to receive one or more selected search policies from the user via a user interface, wherein the one or more selected search policies include at least a time window policy;
- responsive to receiving the one or more selected search policies, program instructions to determine whether the one or more selected search policies are valid, wherein program instructions to determine whether the one or more selected search policies are valid includes program instructions to determine field accuracy by reviewing the one or more selected search policies for one or more errors;
- responsive to determining the one or more selected search policies are valid, program instructions to apply the one or more selected search policies to the first search results;
- program instructions to generate a contextual search request based, at least in part, on the one or more applied selected search policies, wherein the contextual search request is an update of the first search request; and
- program instructions to send search results associated with the contextual search request to the user.

14. The computer system of claim 13, further comprising:
responsive to sending the search results associated with the contextual search request to the user, program instructions to determine whether one or more additional selected search policies are received from the user;
responsive to determining the one or more additional selected search policies are received from the user, program instructions to apply the one or more additional selected search policies to the search results associated with the contextual search request;
program instructions to generate a third search request based, at least in part, on the one or more additional applied selected search policies; and
program instructions to send a plurality of third search results associated with the third search request to the user.

15. The computer system of claim 13, further comprising program instructions to store a search handle and a query associated with the first search request.

16. The computer system of claim 13, wherein program instructions to generate a contextual search request based, at least in part, on the one or more applied selected search policies further comprises:
program instructions to retrieve a modified query, wherein the modified query includes the one or more selected search policies applied to the first search results; and
program instructions to invoke the contextual search request, wherein the second search request includes the one or more selected search policies.

17. The computer system of claim 13, wherein determining whether the one or more selected search policies are valid further comprises:
comparing, by the one or more computer processors, the one or more selected search policies to pre-defined constraints; and
determining, by the one or more computer processors, whether the one or more selected search policies comply with the pre-defined constraints.

\* \* \* \* \*